(12) United States Patent
Lee et al.

(10) Patent No.: US 6,292,358 B1
(45) Date of Patent: Sep. 18, 2001

(54) PORTABLE COMPUTER HAVING A MOVABLE LOUDSPEAKER UNIT

(75) Inventors: Chuan Yuan Lee; Hui-Lian Chang; Yuan Ming, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/337,544

(22) Filed: Jun. 22, 1999

(51) Int. Cl.[7] ........................................ G06F 1/16
(52) U.S. Cl. ..................... 361/683; 361/724; 381/87; 292/42
(58) Field of Search ................. 361/683, 724–727; 381/87, 88, 309; 248/551–553; 312/216, 218; 70/57, 58, 85; 292/42, 148, 151, 307 R

(56) References Cited

U.S. PATENT DOCUMENTS

| | | | |
|---|---|---|---|
| 5,682,290 | * 10/1997 | Markow et al. | 361/683 |
| 5,838,537 | * 11/1998 | Lundgren et al. | 361/683 |
| 5,841,631 | * 11/1998 | Shin et al. | 361/684 |
| 5,847,922 | * 12/1998 | Smith et al. | 361/685 |

* cited by examiner

Primary Examiner—Leo P. Picard
Assistant Examiner—Hung Van Duong
(74) Attorney, Agent, or Firm—Pillsbury Winthrop LLP

(57) ABSTRACT

A portable computer includes a mainframe module, a display panel module, a loudspeaker unit and a connecting unit. The mainframe module has a cavity. The display panel module is connected pivotally to the mainframe module for moving between a closed position and an opened position relative to the mainframe module. The loudspeaker unit has a loudspeaker enclosure disposed movably inside the cavity, and a loudspeaker mechanism received in the loudspeaker enclosure. The connecting unit is connected to the loudspeaker enclosure, and is mounted movably to the mainframe module inside the cavity for permitting the loudspeaker enclosure to move outwardly or inwardly of the cavity.

2 Claims, 11 Drawing Sheets

PORTABLE COMPUTER HAVING A MOVABLE LOUDSPEAKER UNIT

BACKGROUND OF THE INVENTION

1. Field of the Invention

The invention relates to a portable computer, more particularly to a portable computer having a movable loudspeaker unit.

2. Description of the Related Art

A portable computer is usually installed with a CD-ROM drive for playing an audio disc. However, a conventional portable computer has a loudspeaker unit fixed in a mainframe module or a display panel module thereof. When an audio disc is played, audio output radiates in a fixed direction so that the user cannot adjust the direction of the audio output toward him. When the display panel module covers the mainframe module, the audio output is interrupted so that an external loudspeaker unit is needed to hear the audio output.

SUMMARY OF THE INVENTION

Therefore, the main object of the present invention is to provide a portable computer having a movable loudspeaker unit which can be adjusted to face the user.

Another object of the preferred invention is to provide a portable computer having a movable loudspeaker unit which can still provide an audio output even though a display panel module is closed.

According to the present invention, a portable computer includes a mainframe module, a display panel module, a loudspeaker unit and a connecting unit. The mainframe module has a rear side and a cavity. The display panel module has a rear side connected pivotally to the rear side of the mainframe module for moving between a closed position and an opened position relative to the mainframe module. The loudspeaker unit has a loudspeaker enclosure disposed movably inside the cavity, and a loudspeaker mechanism received in the loudspeaker enclosure. The connecting unit is connected to the loudspeaker enclosure, and is mounted movably to the mainframe module inside the cavity for permitting the loudspeaker enclosure to move outwardly or inwardly of the cavity.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
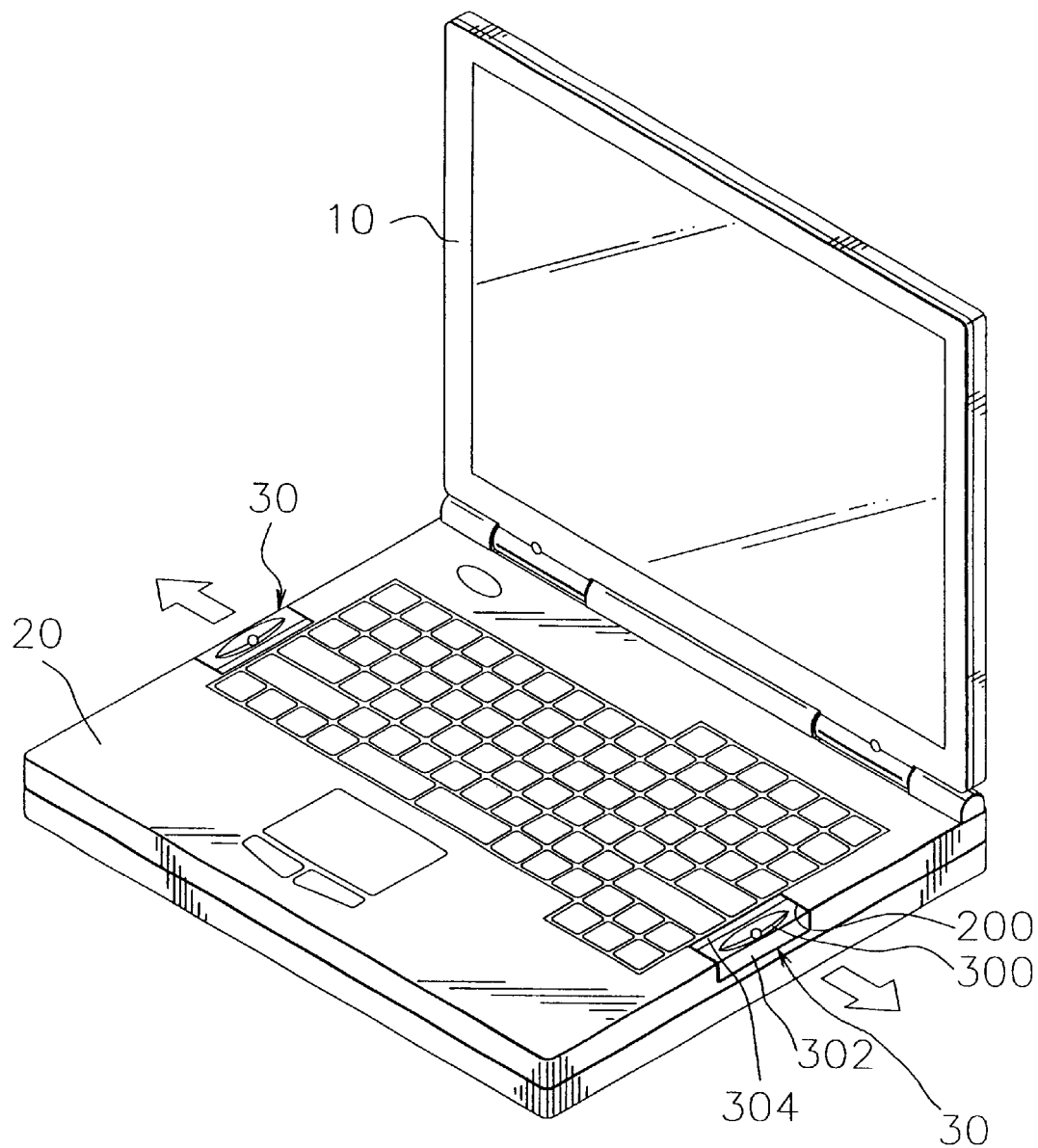
FIG. 1 is a schematic view of the first preferred embodiment of a portable computer according to this invention.
Figure 2:
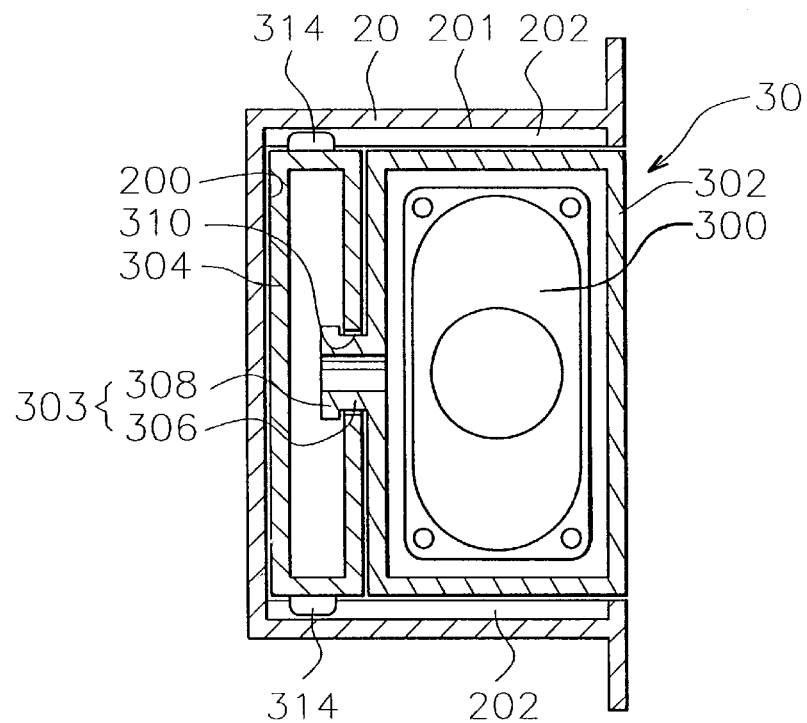
FIG. 2 is a fragmentary sectional top view of a loudspeaker unit at a right side of a mainframe module of the portable computer shown in FIG. 1.
Figure 3:
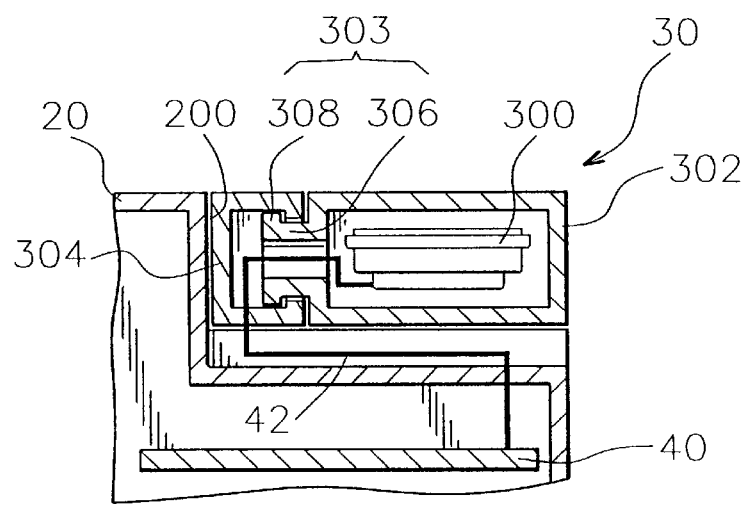
FIG. 3 is a fragmentary sectional front view of the loudspeaker unit at the right side of the mainframe module of the portable computer shown in FIG. 1.

Referring to FIGS. 1 to 3, according to the first preferred embodiment of this invention, a portable computer includes a mainframe module 20, a display panel module 10, two loudspeaker units 30 and two connecting units.

The mainframe module 20 has two cavities 200 disposed at left and right sides thereof, respectively. The cavities 200 are open at the left and right sides and at a top side of the mainframe module 20. Each cavity 200 is confined by a multi-sided cavity wall 201. Each cavity wall 201 is formed with a pair of opposed parallel grooved rails 202.

The display panel module 10 is connected pivotally to the mainframe module 20 and is movable between a closed position and an opened position relative to the mainframe module 20. Each loudspeaker unit 30 has a loudspeaker enclosure 302 disposed movably inside one of the cavities 200, and a loudspeaker mechanism 300 received in the loudspeaker enclosure 302.

Figure 4:
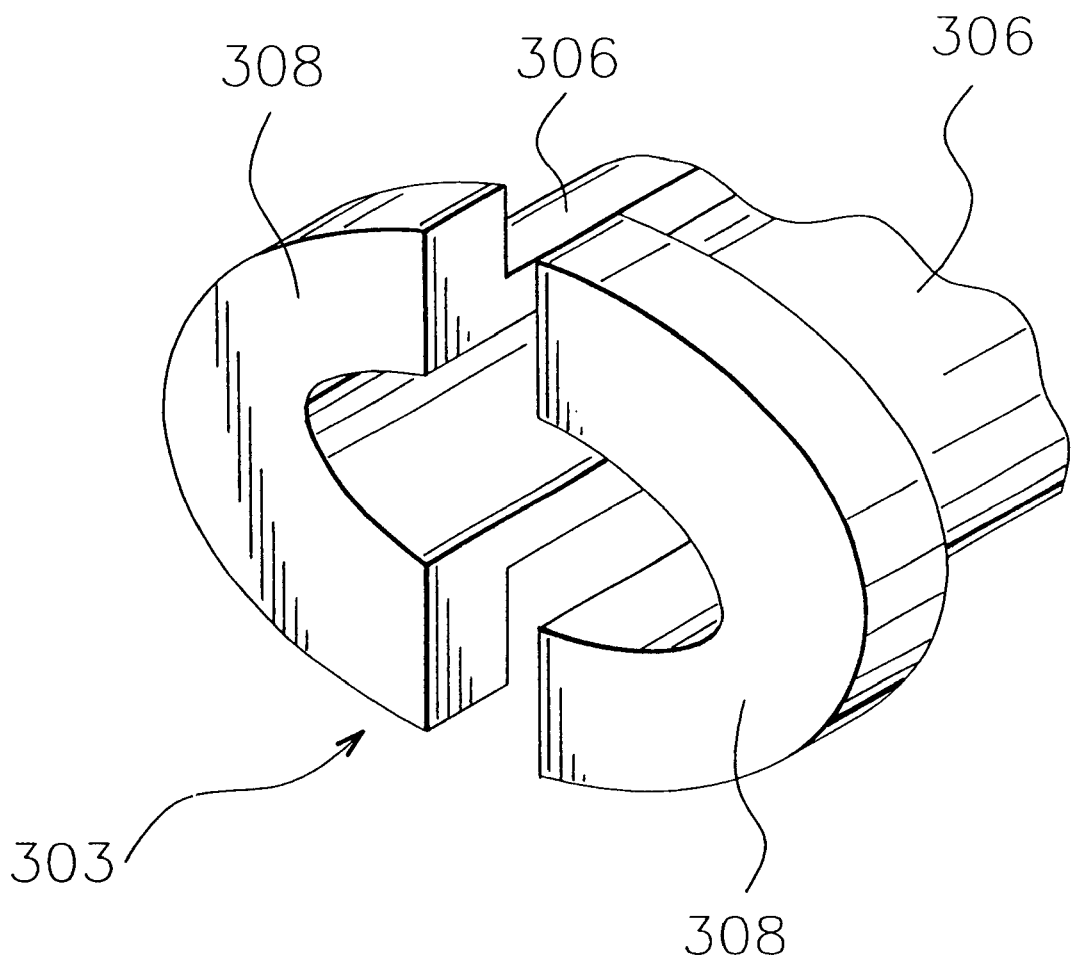
FIG. 4 is a fragmentary perspective view showing a rotary member of the first preferred embodiment.

Each connecting unit includes a supporting seat 304 and a rotary member 303 connected to the supporting seat 302 and the loudspeaker enclosure 302. A pair of protrusions 314 project from two opposed sides of the supporting seat 304 into the grooved rails 202 of the cavity wall 201, respectively, so that the supporting seat 304 is mounted slidably to the mainframe module 20 inside the corresponding cavity 200 and permits the loudspeaker enclosure 302 to move outwardly or inwardly of the cavity 200. The rotary member 303 is hollow and is formed integrally with the loudspeaker enclosure 302, and includes two axially split parts 306 of an arc-shaped cross-section, as best shown in FIG. 4, which are resiliently movable toward one another for insertion through a hole 310 of the supporting seat 304. Each split part 306 has an outward projecting flange 308. When the split parts 306 are pressed toward one another and are inserted into the hole 310 until the flanges 308 extend into the supporting seat 304, the loudspeaker enclosure 302 is rotatably mounted on the supporting seat 304.

Further, in FIG. 3, the loudspeaker mechanism 300 is connected electrically to a circuit board 40 by a wiring 42 which passes through the rotary member 303, the supporting seat 304 and the cavity wall 201 in this embodiment.

Figure 5:
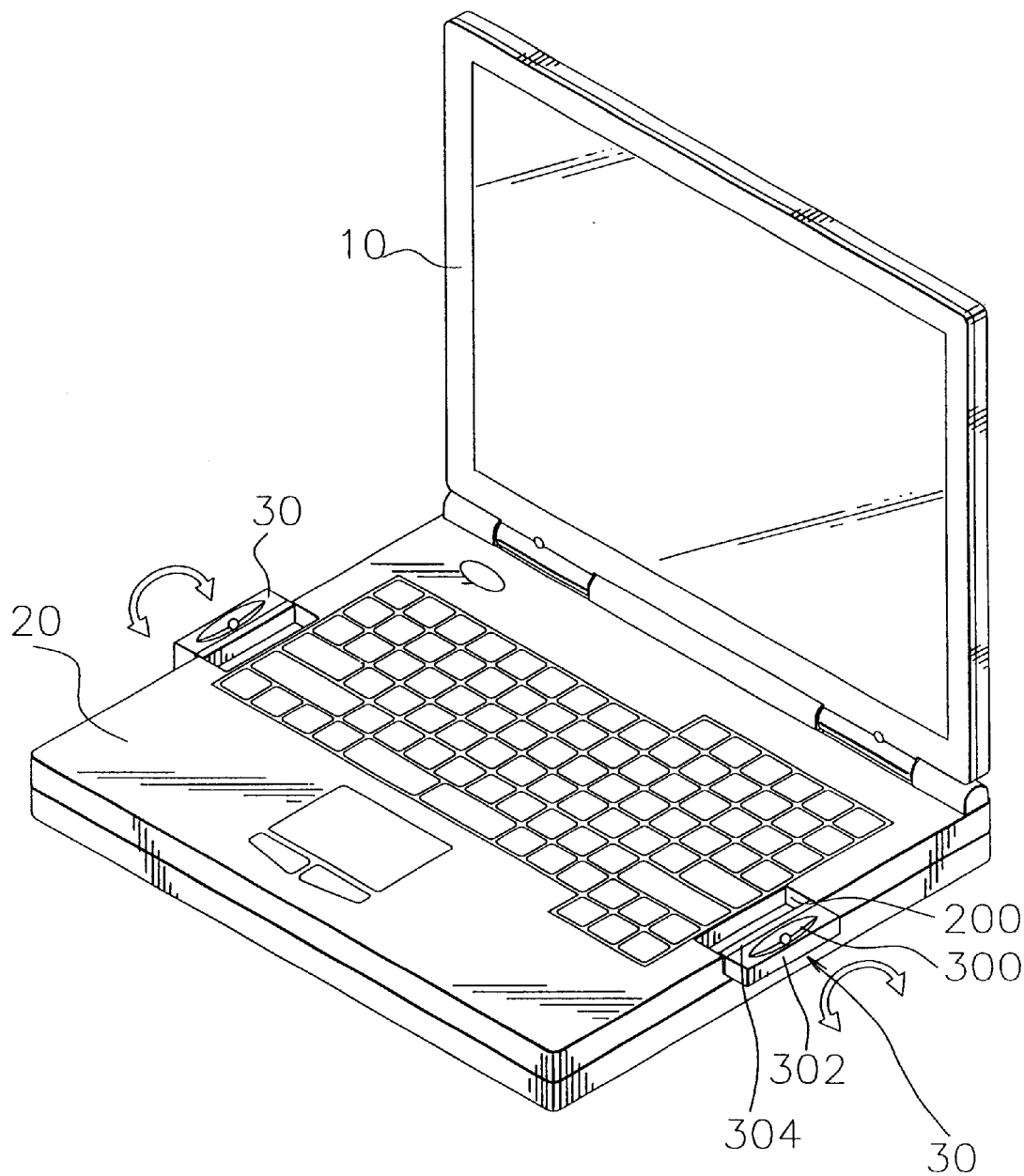
FIG. 5 is a schematic view showing the first preferred embodiment when the loudspeaker units are moved outwardly of two cavities.
Figure 6:
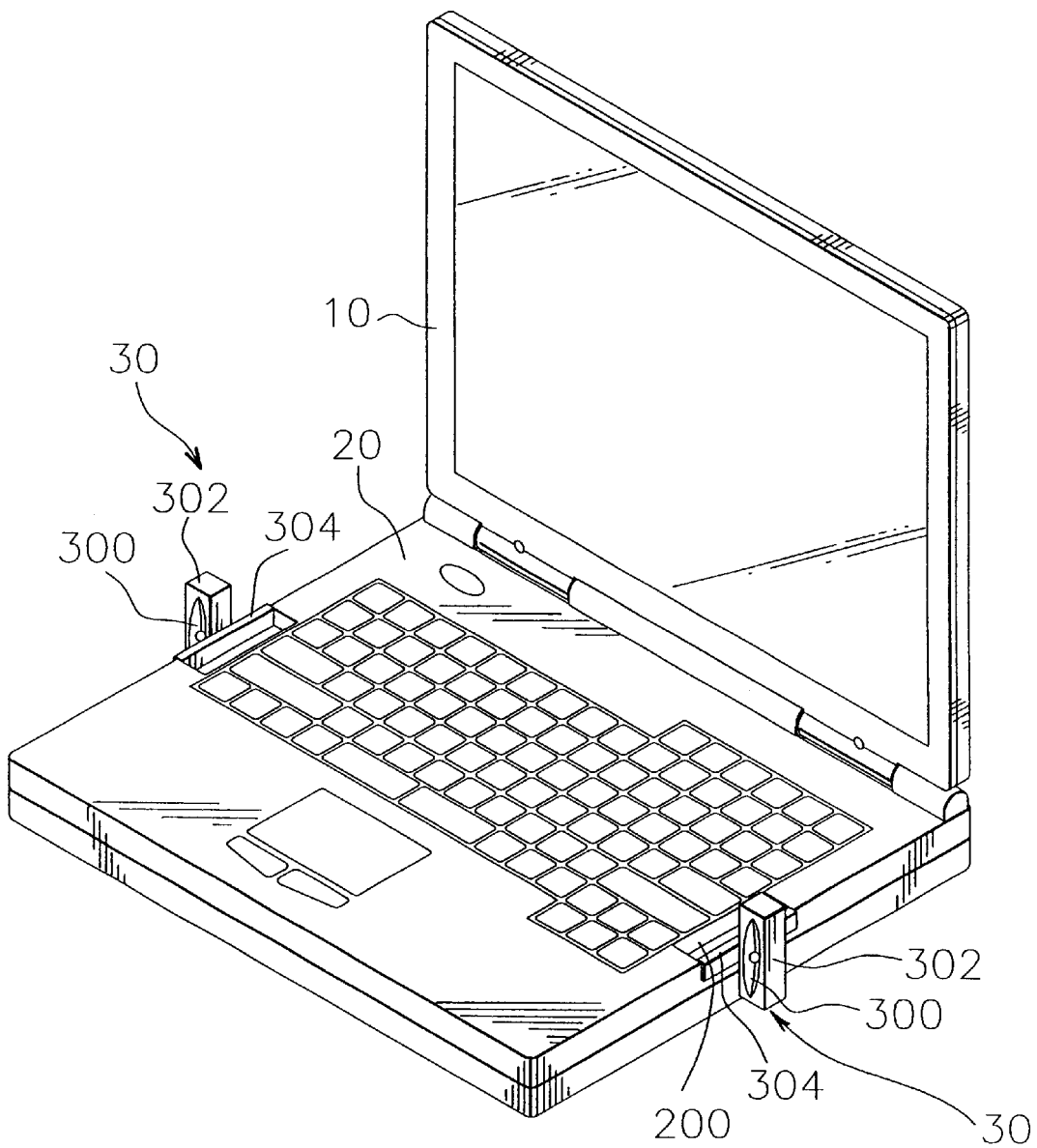
FIG. 6 is a schematic view showing the first preferred embodiment when the loudspeaker units are rotated from the position shown in FIG. 5.
Figure 7:
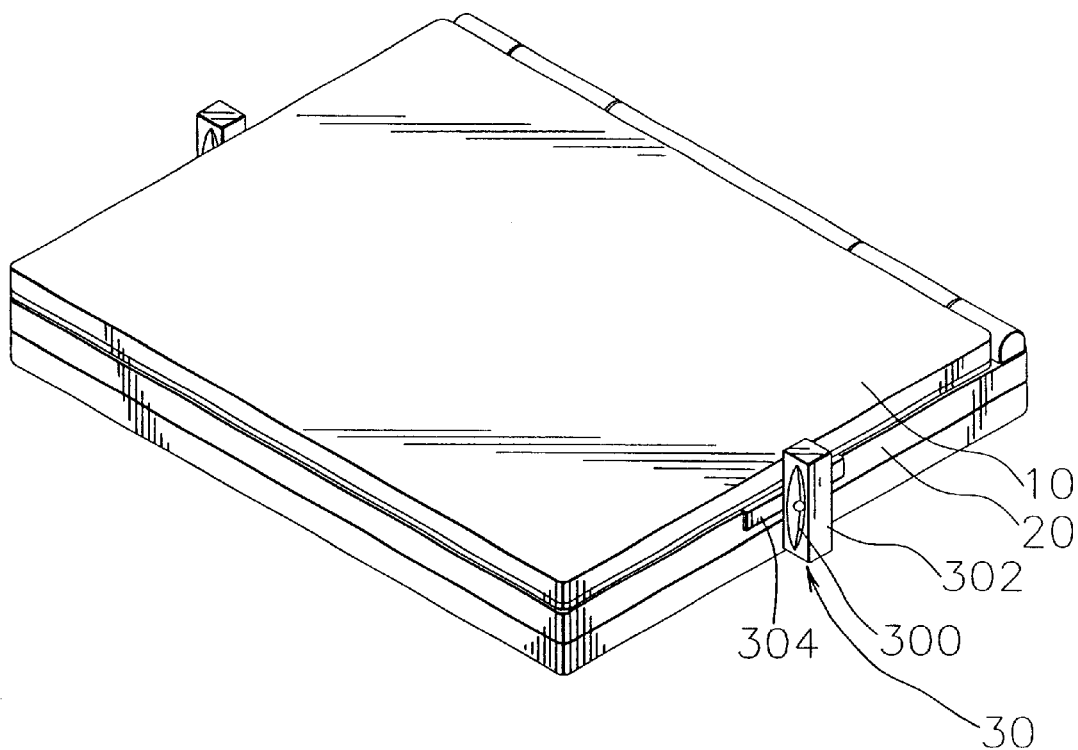
FIG. 7 is a schematic view of the first preferred embodiment when a display panel module covers the mainframe module.

When the loudspeaker units 30 are to be used, the loudspeaker enclosures 302 are first moved out horizontally from the cavities 200, as shown in FIG. 5, and then rotated relative to the supporting seat 304 to a proper position, as shown in FIG. 6. As such, even though the display panel module 10 is moved to the closed position, the loudspeaker units 30 can still be exposed from the portable computer, as shown in FIG. 7, so that audio output from the CD-ROM drive of the portable computer is not interrupted.

Figure 8:
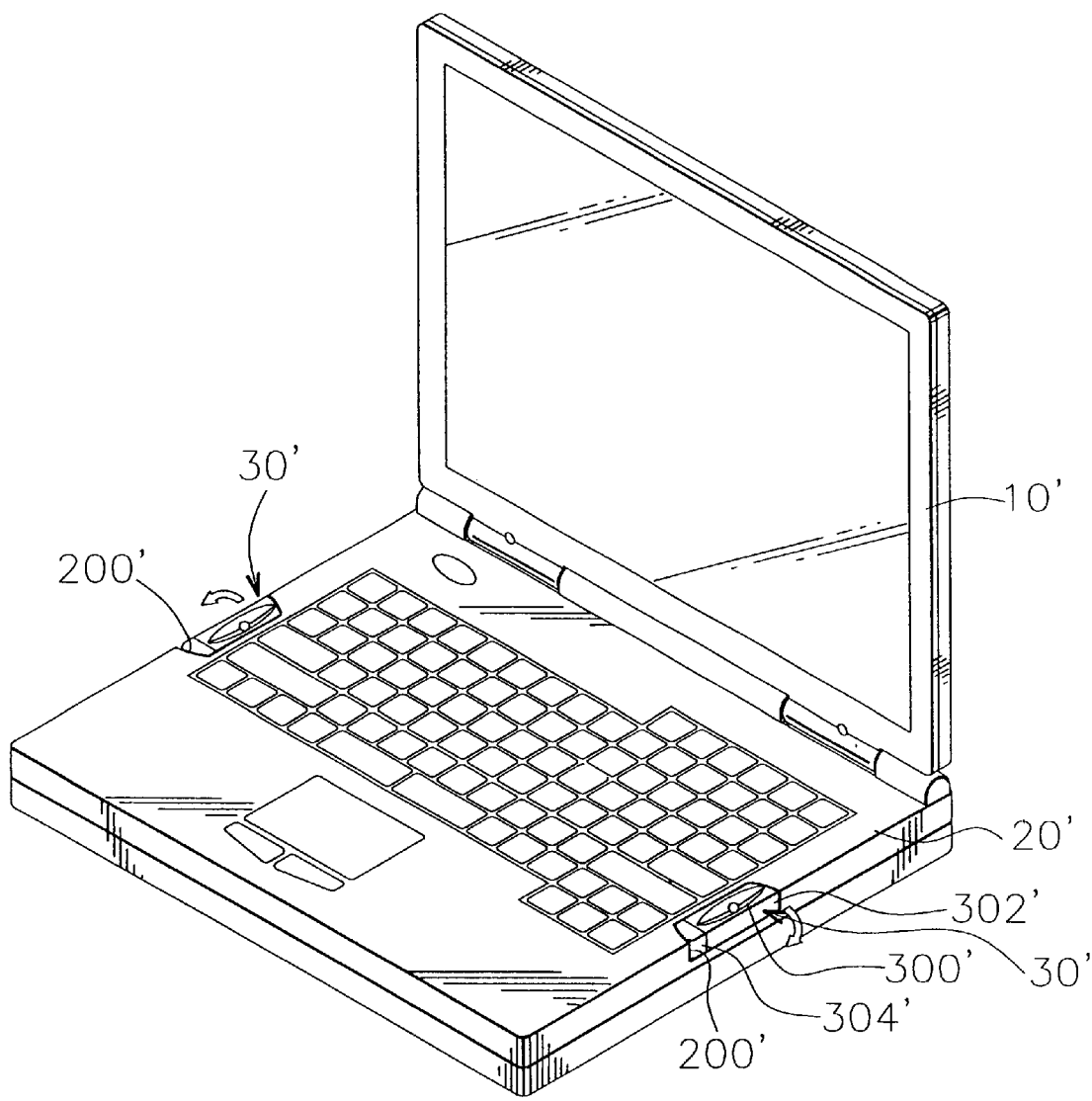
FIG. 8 is a schematic view of the second preferred embodiment of a portable computer according to this invention.
Figure 9:
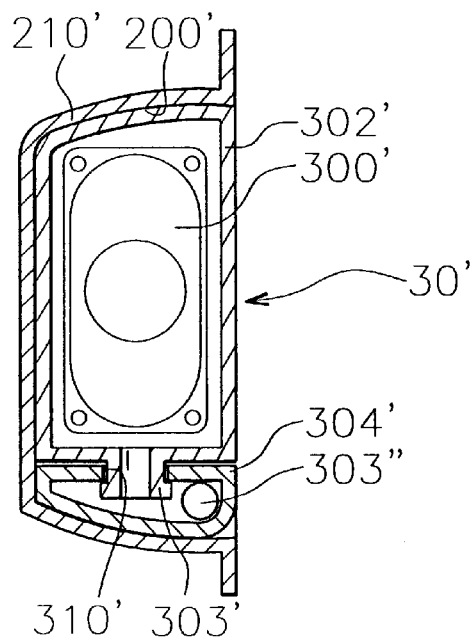
FIG. 9 is a fragmentary sectional top view of a loudspeaker unit at a right side of a mainframe module of the portable computer shown in FIG. 8.
Figure 10:
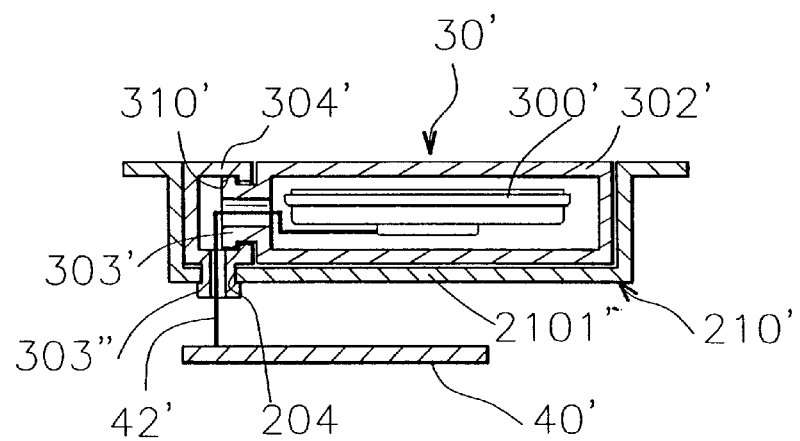
FIG. 10 is a fragmentary sectional side view of the loudspeaker unit at the right side of the mainframe module of the portable computer shown in FIG. 8.

Referring to FIGS. 8 to 10, according to the second preferred embodiment of this invention, a portable computer includes a mainframe module 20', a display panel module 10', two loudspeaker units 30' and two connecting units.

The mainframe module 20' has left and right cavities 200'. Each cavity 200' is open at the left or right side and at a top side of the mainframe module 20', and is confined by a multi-sided cavity wall 210'. The cavity wall 210' has a bottom wall part 2101' exdtending in a plane transverse to the left or right side of the mainframe module 20'. Each loudspeaker unit 30' has a loudspeaker enclosure 302' disposed movably inside each cavity 200' and enclosing a loudspeaker mechanism 300'. Each connecting unit includes a supporting seat 304' and a rotary member 303' connected to the supporting seat 304' and the loudspeaker enclosure 302'. The supporting seat 304' further has a pivot member 303" inserted perpendicularly through the bottom wall part 2101' via a hole 204 formed in the bottom wall part 2101' so that the supporting seat 304' is rotatable relative to the mainframe module 20'. The rotary member 303', which is integral with the loudspeaker enclosure 302', is inserted through a hole 310' in the supporting seat 304' so that the loudspeaker enclosure 302' is rotatable relative to the supporting seat 304'.

Further, in FIG. 10, the loudspeaker mechanism 300' is connected electrically to a circuit board 40' by a wiring 42'.

Figure 11:
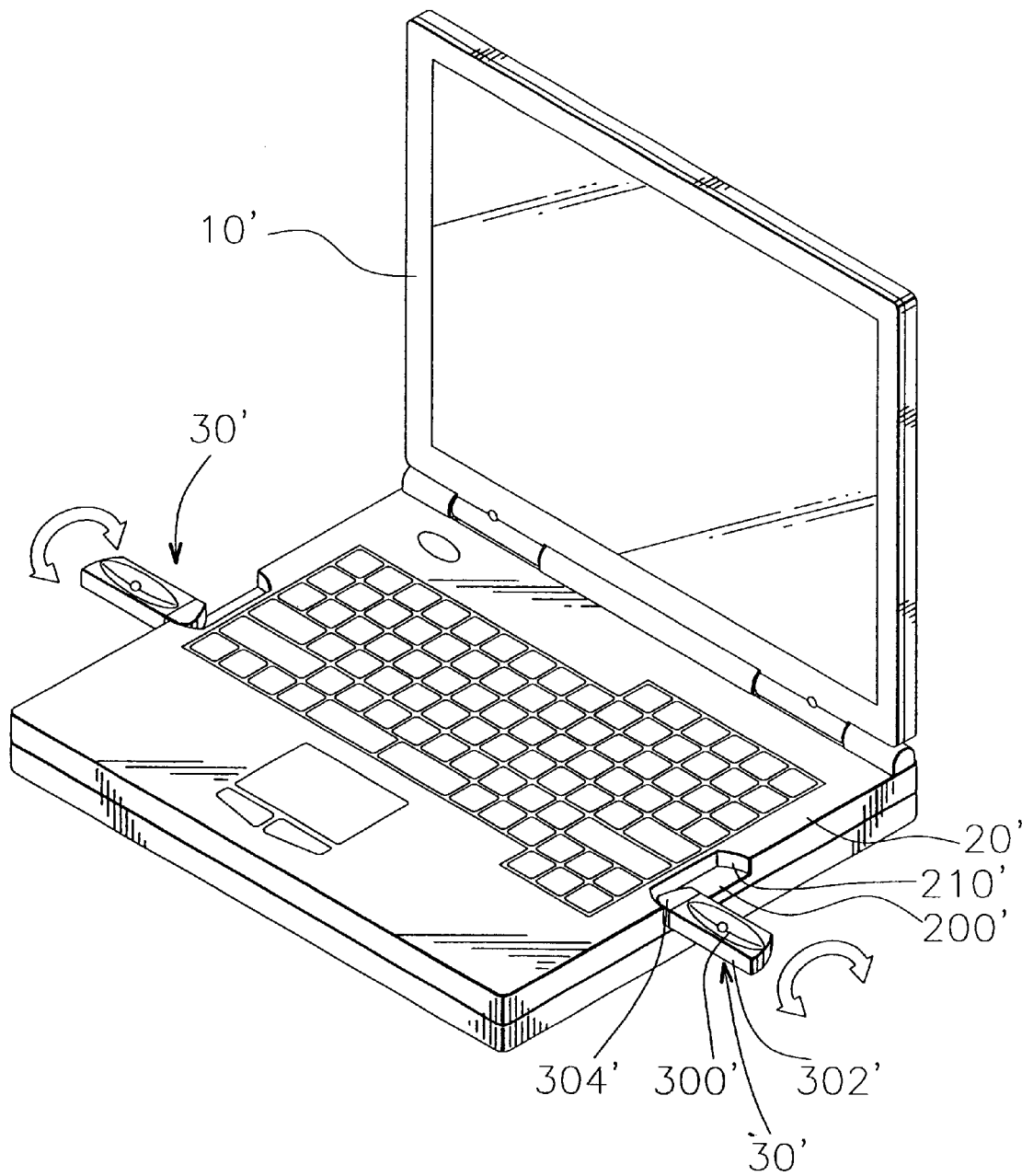
FIG. 11 is a schematic view of the second preferred embodiment when the loudspeaker units are rotated outwardly of two cavities.
Figure 12:
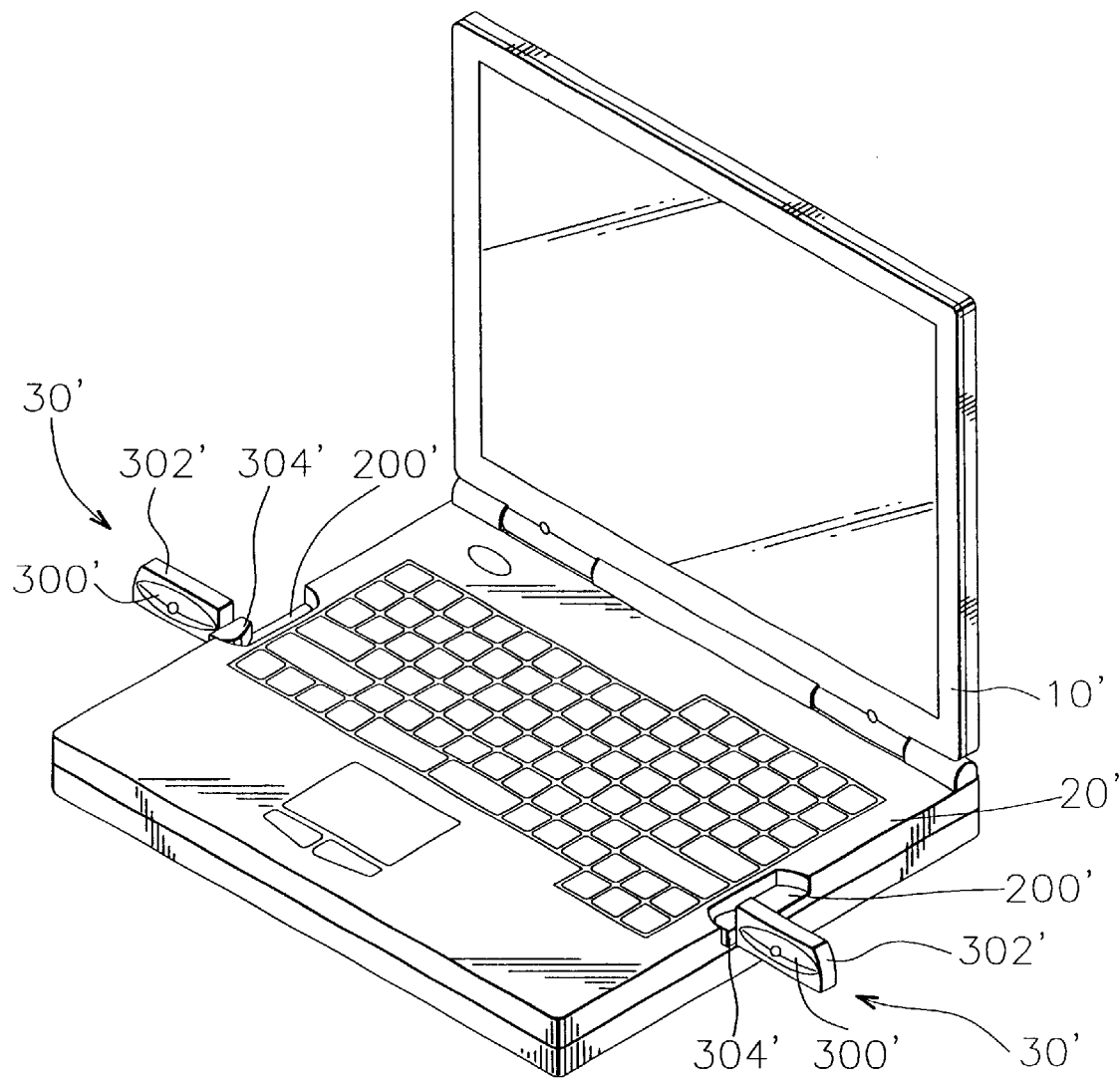
FIG. 12 is a schematic view of the second preferred embodiment when the loudspeaker units are rotated from the position shown in FIG. 11.
Figure 13:
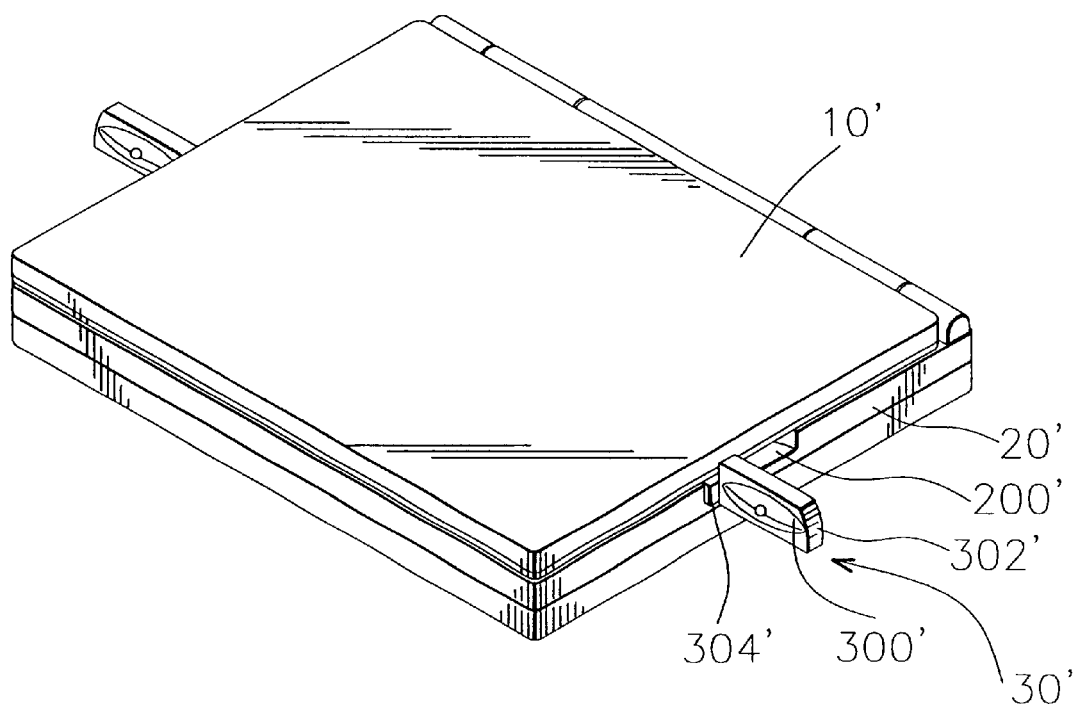
FIG. 13 is a schematic view of the second preferred embodiment when a display panel module covers the mainframe module.

In this embodiment, when the loudspeaker unit 30' is to be used, the loudspeaker enclosure 302' is rotated about the pivot member 303" of the supporting seat 304' to move outward from the respective cavity 200', as shown in FIG. 11, and then rotated relative to the supporting seat 304' to a position shown in FIG. 12. Like the previous embodiment, even though the display panel module 10' is moved to the closed position, the loudspeaker units 30' can still be exposed from the portable computer, as shown in FIG. 13.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A Portable computer comprising:

a mainframe module having a rear side and a cavity;

a display panel module having a rear side connected pivotally to said rear side of said mainframe module for moving between a closed position and an opened position relative to said mainframe module;

a loudspeaker unit having a loudspeaker enclosure disposed movably inside said cavity, and a loudspeaker mechanism received in said loudspeaker enclosure; and a connection unit connected to said loudspeaker enclosure and mounted movably to said mainframe module inside said cavity for permitting said loudspeaker enclosure to move outwardly or inwardly of said cavity, wherein
said mainframe module further has a front side, a left side, and a right side, said cavity being open at least at one of said front, left and right sides in both of said closed and opened position of said display panel module, wherein
said connecting unit includes a supporting seat which is slidable inside said cavity to move said loudspeaker enclosure outwardly of said one of said front, left and right sides, wherein
said mainframe module further includes a multi-sided cavity wall to confine said cavity, said cavity wall having rail means for sliding movement of said supporting seat relative to said cavity wall.

2. The portable computer as claimed in claim 1, wherein said rail means includes a pair of parallel grooved rails formed on said cavity wall, and a pair of protrusions projecting from two opposed sides of said supporting seat into said grooved rails, respectively.

* * * * *